United States Patent [19]

Srinivasan

[11] 3,728,479

[45] Apr. 17, 1973

[54] LOGIC CONTROL FOR VIDEO PROCESSING IN PROGRAM SWITCHERS

[75] Inventor: Nallaswamy Srinivasan, Liverpool, N.Y.

[73] Assignee: General Electric Company, New York, N.Y.

[22] Filed: Oct. 1, 1971

[21] Appl. No.: 185,556

[52] U.S. Cl. ................................ 178/6.8, 178/DIG. 6
[51] Int. Cl. ................................ H04n 5/22
[58] Field of Search ................................ 178/DIG. 6; 179/1 SW

[56] References Cited

UNITED STATES PATENTS

| | | | |
|---|---|---|---|
| 3,619,495 | 11/1971 | Ito | 178/DIG. 6 |
| 3,472,957 | 10/1969 | Kaye | 178/DIG. 6 |
| 3,604,849 | 9/1971 | Skrydstrup | 178/DIG. 6 |

*Primary Examiner*—Howard W. Britton
*Attorney*—Michael Masnik

[57] ABSTRACT

Amplitude sharing of a plurality of video signals to produce special visual effects by use of parallel arranged switching amplifiers employing digital control of gain controlling analog signal generating circuits.

9 Claims, 7 Drawing Figures

INVENTOR.
NALLASWAMY SRINIVASAN
BY Michael Masnik
HIS ATTORNEY

INVENTOR.
NALLASWAMY SRINIVASAN

BY Michael Masnik

HIS ATTORNEY

INVENTOR.
NALLASWAMY SRINIVASAN
BY Michael Masnik
HIS ATTORNEY

INVENTOR.
NALLASWAMY SRINIVASAN
BY Michael Masnik
HIS ATTORNEY

LOGIC CONTROL FOR VIDEO PROCESSING IN PROGRAM SWITCHERS

INTRODUCTION

This invention relates to program switchers for television productions, and more particularly to controls for amplitude sharing of a plurality of video signals to produce special visual effects.

A program switcher as used in a television studio control room is essentially an electronic image editor which selects the desired image or images at the operator's discretion. These images may be selected individually or in combination. One type of combination which may be achieved is a "mix" of two images, sometimes called a superimposition or a lap dissolve. In this combination, the video signals are presented at the same time, but their amplitudes are varied to produce a desired bland in an amplitude-sharing mode. A second type of combination is time-sharing, or combination by "priority." That is, one image, or a portion thereof, has complete priority over the other image or a portion thereof. Electronically, this is accomplished by keying in the desired image at the proper time. Modern switching systems incorporate both of these methods of combining images.

The present invention is concerned with the former type of combination; that is, the mixing or amplitude sharing of a plurality of video signals. In a prior art arrangement involving let's say three video signals A, B and C, videos A and B are first mixed in a first mixing amplifier which is controlled by an A-B fader. The fader constitutes essentially a control lever at the operator's console which varies the relative degree of mix or amplitude sharing of two signals. The combined output of this first mixing amplifier is mixed with video C in a second mixing amplifier which is controlled by the C-D fader. The output of the second mixing amplifier is the required output. This arrangement requires the processing of signals in two mixing amplifiers in series. The series arrangement introduces undesirable time delays in the processed video signals. This is particularly troublesome when color signals are being switched, since a timing error of merely two nanoseconds can produce a visible shift in color hue. To correct for such timing errors, conventional switchers employ delay lines to compensate for the resulting errors. This results in an undesirably high degree of circuit complexity. These problems are treated in greater detail in a copending application Ser. No. 128,315 filed Mar. 26, 1971 for Fred M. Eames, Jr. entitled "Program Switcher" and assigned to the common assignee. This application presents a solution to these problems by providing that all the video signals pass through the processing amplifiers only once. The video signals are either time shared or amplitude shared, or both, to create the effects of key, mix or a combination of both respectively. This leads to very good technical performance and the ability to do more functions without expanding the size of the switcher. Logic circuits provide the processing amplifiers, the necessary switching data for time sharing and control signals for amplitude sharing. The functioning of this arrangement will be described shortly in greater detail. In such an arrangement, there is a need for analog logic circuitry for processing the video signals selectively in an amplitude-sharing mode.

Accordingly, one object of the invention is to provide a television program switcher providing improved amplitude-sharing control of video signals.

Another object is to provide an improved arrangement for amplitude sharing two or more video signals wherein their relative amplitudes are varied by an operator's fader control.

A further object of this invention is to provide an improved arrangement to process and distribute "$n$" number of input control signals to "$2n$" number of output control signals for use in amplitude sharing of a plurality of video signals.

A further object of this invention is to provide amplitude control of video signals where the video signals are parallel processed.

A further object of the invention is to provide an arrangement to process and distribute "$n$" number of input control signals to "$2n$" number of output control signals for amplitude sharing of a plurality of video signals where the output control voltages are normally proportional to their respective input control signals but some of the output control signals can be further modified by other input control signals.

A further object of this invention is to provide an improved signal processing arrangement.

Briefly, in accordance with one embodiment of my invention there is provided an arrangement for combining any selected three of the four possible video signals on an amplitude-sharing basis using respective parallel connected switching amplifiers for each of the video signals. The gain of the amplifiers is controlled by four unidirectional control signals $V_R - E_{AB}$, $E_{AB}$, $V_R - E_{CD}$ and $E_{CD}$ wherein $E_{AB}$ and $E_{CD}$ are independently adjustable between a lower and an upper amplitude limit $V_R$. Means are provided for modifying the amplitude of said $V_R$ - $E_{AB}$ and said $E_{AB}$ control signals as a function of $E_{CD}$ to provide respective modified control signals. Each of the amplifiers corresponding to the selected video signals is made responsive to a respective one of said $E_{CD}$, $V_R - E_{CD}$ and said modified $E_{AB}$ and modified $V_R - E_{AB}$ control signals for modifying the amplitude of its respective video signal while maintaining the amplitude of the selected video signals constant over the range of adjustments of said $E_{AB}$ and $E_{CD}$ signals.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1A:
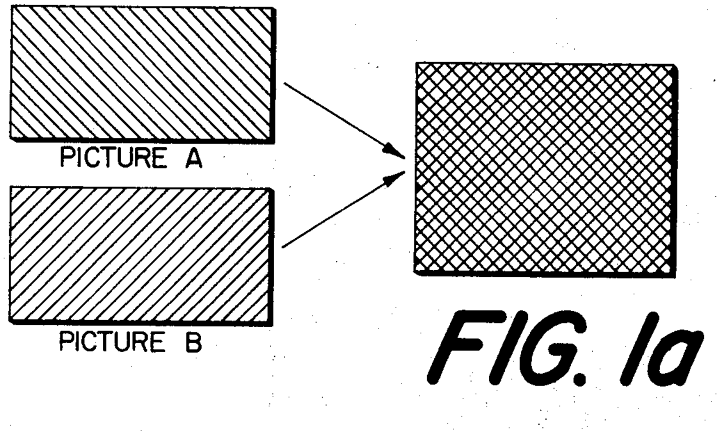
FIGS. 1*a*, 1*b* and 1*c* illustrate graphically a number of special effects which an operator can produce on a television screen applying amplitude and time-sharing control of video signals.

The function of a studio program switcher is to select the proper picture or pictures at the operator's discretion. The pictures may be selected individually or in combination. One type of combination is a mix or an amplitude sharing of two pictures which is illustrated in FIG. 1*a*. Here the video signals are presented at the same time but their amplitudes are varied to give a pleasing blend. Another type of combination is one by priority as, for example, in FIG. 1*b* in which a desired picture is keyed into another picture, the keying signal being derived from either electronic waveform generators or from a video signal. Finally, it is possible to use both of these methods in tandem as, for example, in FIG. 1*c*.

In conventional program switchers, the functions described above were exercised by routing the video signals through different video processors such as mixing amplifiers, special effect, etc. As previously mentioned, one arrangement to perform these functions was by operating a plurality of mixing amplifiers in series. However, since every electrical device delays the video signals, such arrangements required circuitry to compensate for the various delays. Furthermore, as the number of video signals to be combined increased, they had to be passed through different processing devices resulting in differences in signal routing for each mode of operation. As the size of the system increased, therefore, the adjustment of propagation delay became more difficult and time consuming.

Figures 2, 3:
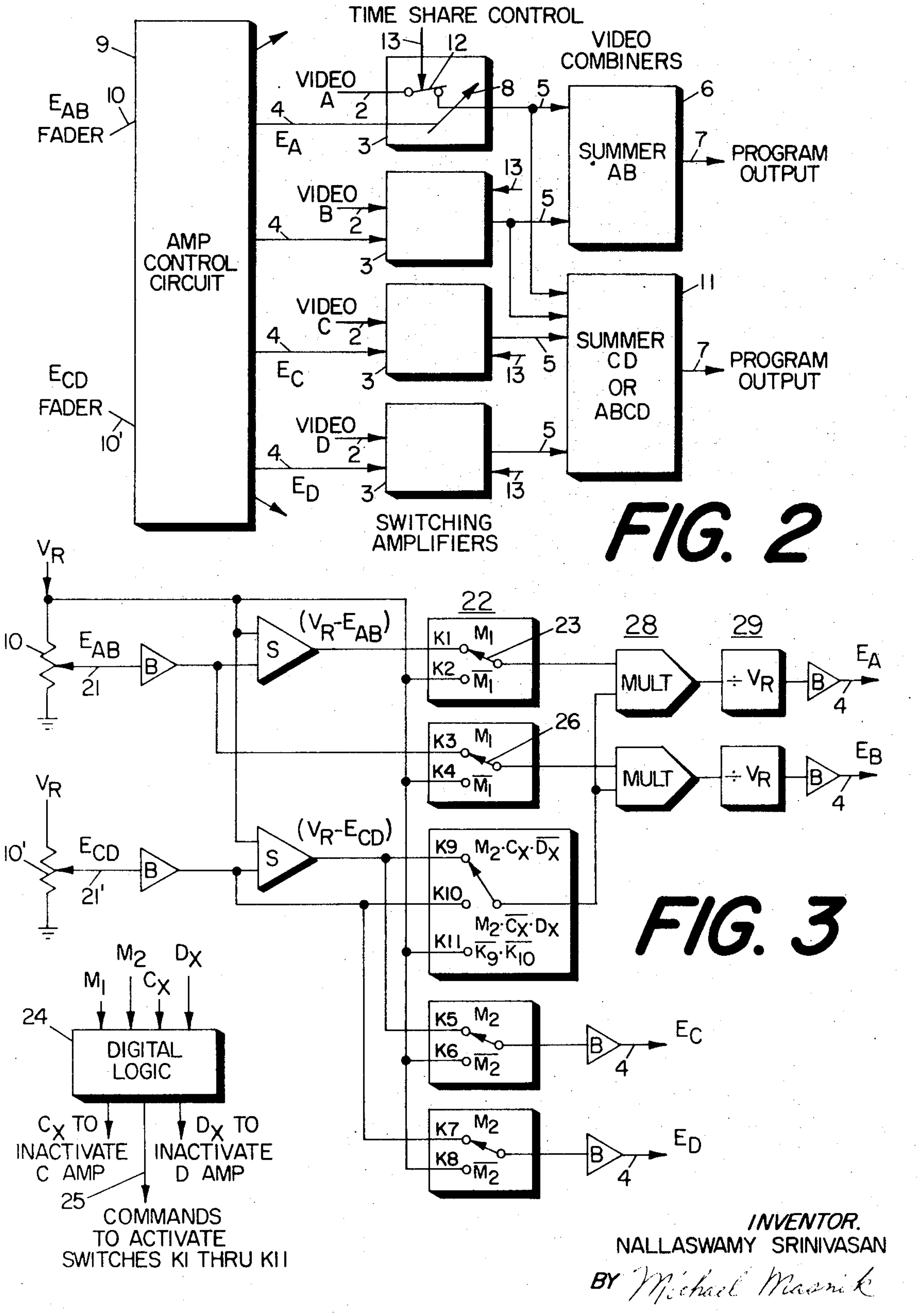
FIG. 2 illustrates in generalized block diagram form the concepts of parallel video processing including amplitude sharing of a plurality of video signals.
FIG. 3 is a part schematic and part block diagram of an amplitude control circuit similar to the system of FIG. 2 except arranged to provide four output signals in response to two input control signals.

To minimize the video signal delay through the system and to improve the quality of the picture, a system of parallel video processing was developed as shown in FIG. 2. In this approach, such functions as time sharing and amplitude sharing could be obtained either separately or in tandem. Referring to FIG. 2, there is shown an arrangement wherein video signals such as video A on lead 2 have their amplitude modified in switching amplifier 3 in accordance with control signals $E_A$ available on lead 4. In a similar manner, video signals B have their amplitudes controlled in a corresponding switching amplifier 3 in accordance with control signals $E_B$ available on a corresponding lead 4. Amplitude modified or controlled video signals A and B on corresponding leads 5 are combined in summer 6 to provide amplitude-shaped video A and B signals on the output lead 7 going to a utilization circuit such as a program distributor or monitor. Where it is desired to provide a composite mix of pictures A and B as shown in FIG. 1*a*, it is necessary to vary the relative degree of mix or amplitude sharing of two video signals A and B. This is shown symbolically in FIG. 2 by the arrow 8 which represents a means for varying the gain of the amplifier 3 and hence the amplitude of the video A signals in accordance with the control signal available on 4. To vary the relative amplitudes of the video signals A and B requires that the gain controlling signal or amplitude controlling signals $E_A$ and $E_B$ also be relatively varied in amplitude. This is a function of the amplitude control circuit block 9. Control circuit 9 is shown to contain control levers or faders 10 which are operated by an operator to vary the relative degree of mix or amplitude of the amplitude controlling signals $E_A$ and $E_B$. In operating the lever 10 from one position to another, the amplitude of the $E_A$ signal is varied from zero to full amplitude while the amplitude of the $E_B$ signal is varied from full amplitude to zero. A mid-location of the control lever would provide, for example, 50 percent of full amplitude of the $E_A$ signal and 50 percent of full amplitude of the $E_B$ signal. This, in turn, would result in the video A and video B signals on leads 5 being at their 50 percent amplitude levels also. In a similar manner, there is shown a control lever or fader 10 to provide $E_C$ and $E_D$ amplitude control signals for varying the amplitude of video signals C and D applied to respective switching amplifiers 3 so that the video output signals on leads 5, being applied to summing amplifier 11, have their amplitudes varied in accordance with the position of the control lever 10 associated with the $E_C$ and $E_D$ control signals.

Figure 1B:
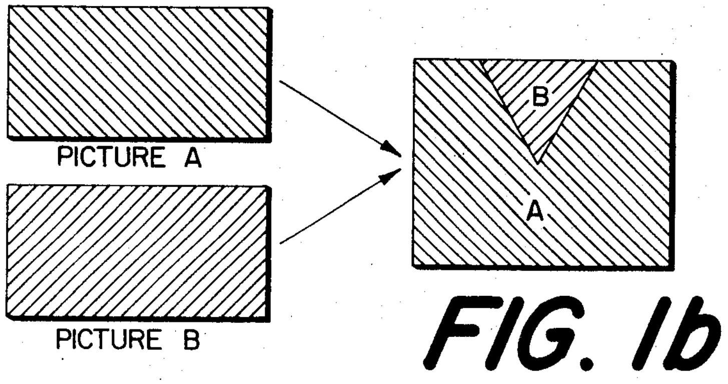
Figure 1C:
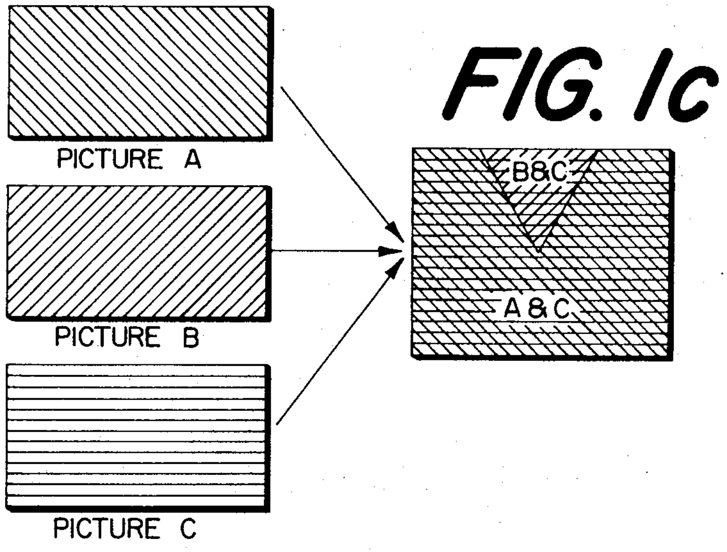

While the switching amplifier 3 has been shown to provide an amplitude control function symbolically shown by arrow 8, they also provide a time-sharing function. This is shown symbolically again in the upper block 3 by a switch 12 which is operated under the control of a time-share control signal available on lead 13. It is possible as set forth in greater detail in the aforementioned application to time share each of the video signals A, B, C and D in their respective switching amplifiers to provide special effects referred to as priority and illustrated in FIGS. 1*b* and 1*c*. The versatility of the arrangement of FIG. 2 is apparent in referring to FIG. 1*b* and noting that one can amplitude mix pictures A and B represented by video signals A and B as shown in FIG. 1*a*, can time share the video signals A and B as shown in FIG. 1*b* and can produce a combination of amplitude and time sharing of three video signals A, B and C as shown in FIG. 1*c*. For purposes of the present discussion, however, it will be assumed that all of the switches 12 are closed, as shown, and that the system operates in the amplitude-sharing mode. A significant factor to note is that all of the processing, both time sharing and amplitude sharing, takes place in parallel arranged switching amplifiers with the attendant advantages previously explained.

According to FIG. 3, there is shown an amplitude control circuit which responds to digital commands initiated by an operator to select the combination of video signals one desires to mix in the amplitude-sharing mode. In this arrangement, four amplitude control signals $E_A$, $E_B$, $E_C$ and $E_D$, available on leads 4, are to have their amplitudes varied in accordance with fader controls 10 and 10'. Each of the faders comprises, in effect, a potentiometer connected to a unidirectional or DC reference voltage $V_R$ with the tapping point 21 adjustable from zero to maximum or $V_R$ voltage amplitude. The arrangement of FIG. 3 is such that as the tap 21 which produces a voltage $E_{AB}$ is moved from zero to $V_R$ the relative amplitudes of $E_A$ and $E_B$ on lead 4 are varied. For example, with $E_{AB}$ at its maximum voltage $V_R$, the control voltage $E_A$ is zero whereas the control voltage $E_A$ is zero whereas the control voltage $E_B$ is maximum or or 100 percent amplitude. At the mid-point of the potentiometer, the $E_A$ and $E_B$ voltages are at 50 percent maximum amplitude. At the zero end of the potentiometer, the $E_A$ voltage is at 100 percent amplitude and $E_B$ voltage is at 0 percent amplitude.

Let us consider the arrangement of FIG. 3 for the condition where we desire to obtain two output control signals $E_A$ and $E_B$ in response to one input control signal $E_{AB}$. The processing is such that the output control voltages or signals are defined as follows:

$E_A = [V_R \text{ or } (V_R - E_{AB})]$ $E_B = (V_R \text{ or } E_{AB})$

In order to program the arrangement of FIG. 3 to provide only the $E_A$ and $E_B$ voltages, switches 22 are provided. These are shown as single pole, multiple throw switches which respond to the digital command signals associated therewith. For example, moving contact 23 closes on terminal K1 in response to receipt of an $M_1$ signal available from the digital logic circuit 24. Digital logic circuit 24 provides an arrangement of push buttons for generating switching command signals in binary digital form, for example, occurring at a logic 1 or logic 0 state. Each button is associated with a respective input switching signal $M_1$, $M_2$, $C_X$, $D_X$ to produce either an $M_1$ or $\overline{M_1}$, $M_2$ or $\overline{M_2}$, $C_X$ or $\overline{C_X}$, $D_X$ or $\overline{D_X}$ signal at the discretion of the operator. $M_1$ push button in one position establishes a logic 1 on the output lead 25 for energizing a magnetic circuit not shown to drive moving contact 23 to terminal K1. Operation of the $M_1$ push button to its logic state 0 causes the moving contact 23 to be driven to terminal K2. This is represented by the $\overline{M_1}$ location in the switch position associated with K2. In addition, moving contact 26 responds to the logic state 1 of $M_1$ to close on contact K3 or to logic state 0 to close on contact K4. In this arrangement, control voltage $V_R$ - $E_{AB}$ is applied to contact K1 and a voltage $E_{AB}$ is applied to contact K3. By varying the value of $E_{AB}$ by operating the fader 10, the relative amplitudes of the $E_A$ and $E_B$ signals on lead 4 can be changed. It should be noted that this arrangement results in the sum of the two control voltages adding up to the reference voltage $V_R$. Let us say that we want to mix pictures A and B so that the final picture is composed of 60 percent of A and 40 percent of B. Let us say that $V_R$ volts represent unity video gain and 0 volts represent no video. The control voltages for the gain elements of switching amplifiers with $E_A$ and $E_B$ should be $0.6 \times V_R$ and $0.4 \times V_R$ respectively. One end of the fader potentiometer 10 is connected to $V_R$ volts and the other end is grounded. The control voltage $E_{AB}$ is used as $E_B$, which eventually will control the gain of video B. $E_A$, the control voltage that regulates the gain of video A, is developed by subtracting $E_{AB}$ from $V_R$.

Since the amplitude of each video signal is directly proportional to its control voltage, the total gain of a mix of the two video signals A and B will remain constant for any position of the fader 10 lever. If no amplitude sharing is desired, the push button associated with $M_1$ is operated to its $\overline{M_1}$ position thereby applying $V_R$ voltage to leads 23 and 26 which is the unity gain condition desirable for time sharing so that video A and video B appear at 100 percent amplitude but may be time shared in amplifiers 3 under control of the time-sharing signals available on lead 13 for operating switches 12.

If it is desired to mix three video signals A, B and D, the system operates as follows. The $M_1$ position push button is pushed to its logical 1 state thereby operating switch 23 to K1 and 26 to K3. In addition, witch $M_2$ is pushed to its logical 1 state, $C_X$ to its logical 1 state and $D_X$ to its logical 0 state. This results in closing movable contact 27 on lead K9. Circuits for accomplishing this are well known and are only shown schematically. Under these circumstances, the mix of signals A and B is controlled by the $E_{AB}$ fader. Mix of picture D and the picture formed by the combination of A and B is controlled by the C-D fader. This is sometimes referred to as a mix-to-mix mode of operation. With the control voltages $E_{AB}$ and $E_{CD}$, outputs $E_A$, $E_B$, $E_C$ and $E_D$ can be generated. $E_A$ and $E_B$ are normally proportional to $E_{AB}$ or equal to $V_R$, but upon certain digital commands they can be further modified by $E_{CD}$. The outputs $E_C$ and $E_D$ are proportional to $E_{CD}$ or equal to $V_R$. These relationships, established by the operation of the arrangement of FIG. 3, are illustrated in the following equations:

$E_A = [V_R \text{ or } (V_R - E_{AB})] \times [1 \text{ or } F(E_{CD})]$ $E_B = [V_R \text{ or } E_{AB}] \times [1 \text{ or } F(E_{CD})]$ $E_C = [V_R \text{ or } (V_R - E_{CD})]$ $E_D = [V_R \text{ or } E_{CD}]$ where $F$ represents the symbol for the words "function of."

For a mix of signals A, B and D as previously mentioned, the $E_C$ channel must be turned off. This, of course, is provided, as previously mentioned, by operating the $M_1$, $M_2$ and $C_X$ buttons to a logical 1 state and the $D_X$ button to the logical 0 state. Under these circumstances:

$E_A = (V_R - E_{AB})(V_R - E_{CD})/V_R$ $E_B = (E_{AB})(V_R - E_{CD})/V_R$ $E_D = E_{CD}$ $E_A + E_B + E_D = V_R$

Since the sum of the control voltages equals $V_R$, then the sum of the video amplitudes for all three video signals would be equal to unity gain. The multiplication process, of course, is provided by multipliers 28 and the division by divider circuits 29. The blocks labeled B constitute buffers and those indicated as SUB constitute subtraction circuits. Thus, the arrangement of FIG. 3 provides four output control signals in response to two adjustable input signals where the combination of output control signals is established by digital commands $M_1$, $M_2$, $C_X$ or $D_X$. For a mix of the three signals A, B and D, the $M_1$, $M_2$ and $C_X$ buttons are operated to a logic 1 state and $D_X$ to a logic 0 state. The $C_X$ signal also inactivates the C switching amplifier 3 by any known means such as opening switch 13 in the amplifier. For a mix of A, B and C, signals $M_1$, $M_2$, $\overline{C_X}$ and $D_X$ are generated by push button operation with the $D_X$ signal also inactivating the D switching amplifier 3 by any known means such as opening switch 13 in the D amplifier.

The digital commands or switching signal which need to be generated in the digital logic circuit 24 by actuation of four push buttons in order to operate the several relays or switches 22 can be summarized as follows:

| Relay No. | Needed Function to Operate Relay |
|---|---|
| K1 | $M_1$ |
| K2 | $\overline{M_1}$ |
| K3 | $M_1$ |
| K4 | $\overline{M_1}$ |
| K5 | $M_2$ |
| K6 | $\overline{M_2}$ |

| | |
|---|---|
| K7 | $M_2$ |
| K8 | $\overline{M_2}$ |
| K9 | $M_2 \cdot C_X \cdot \overline{D_X}$ |
| K10 | $M_2 \cdot \overline{C_X} \cdot D_X$ |
| K11 | $\overline{K9\ K10}$ |

If $C_X = 1$, C switching amplifier is inactivated. If $D_X = 1$, D switching amplifier is inactivated.

This arrangement permits the selection of up to three video signals for display out of four available, such as, A, B, C, D, AB, AC, AD, BC, BD, CD, ABD and ABC.

Figure 4:
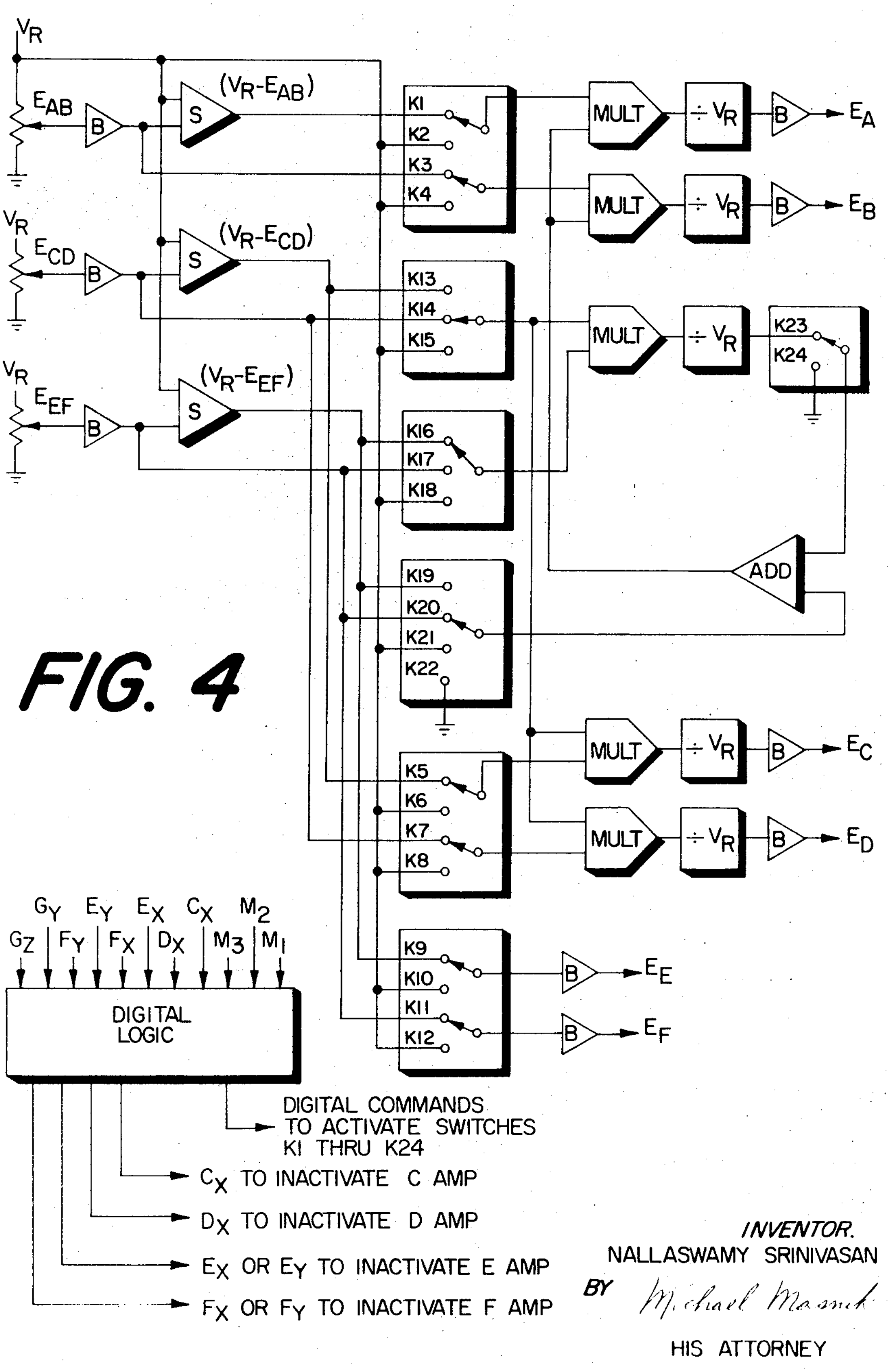
FIG. 4 is a part schematic and part block diagram of an amplitude control circuit employed in the apparatus of FIG. 2 wherein six output control signals may be developed in response to three input signals.

The same principle can be extended when a mix of more than three videos is to be achieved as, for example, by the arrangement of FIG. 4. Here the input control voltages are $E_{AB}$, $E_{CD}$ and $E_{EF}$. The input digital commands are $M_1$, $M_2$, $M_3$, $C_X$, $D_X$, $E_X$, $F_X$, $E_Y$, $F_Y$, $G_Y$ AND $G_Z$. The output control voltages are $E_A$, $E_B$, $E_D$, $E_E$ and $E_F$. The processing achieved by the arrangement of FIG. 4 includes the following:

$$E_A = \{V_R \text{ or } (V_R - E_{AB})\} \times \{[1 \text{ or } 0 \text{ or } F(E_{EF})] + [[(1 \text{ or } F(E_{CD})) \times (1 \text{ or } F(\bar{E}_{EF}))] \text{ or } 0]\}$$

$$E_B = \underbrace{\{V_R \text{ or } E_{AB}\}}_{1} \times \{\underbrace{[1 \text{ or } 0 \text{ or } F(E_{EF})]}_{2} + \underbrace{[[(1 \text{ or } F(E_{CD})) \times (1 \text{ or } F(E_{EF}))] \text{ or } 0]}_{3}\}$$

Bracket 1 processing is determined by the input command $M_1$. Bracket 2 is determined by commands $M_3$, $C_X$, $D_X$, $E_X$, $F_X$, $E_Y$, $F_Y$, $G_Y$ and $G_Z$. Bracket 3 is determined by the commands $M_2$, $M_3$, $C_X$, $D_X$, $E_X$, $F_X$, $E_Y$, $G_Y$, $G_Z$ and $F_Y$.

For $E_C$, $E_D$, $E_E$ and $E_F$, the processing is not as complicated as for $E_A$ and $E_B$.

$E_C = [V_R \text{ or } (V_R - E_{CD})] \times [1 \text{ or } F(E_{EF})]$ $E_D = [V_R \text{ or } E_{CD}] \times [1 \text{ or } F(E_{EF})]$ $E_E = [V_R \text{ or } (V_R - E_{EF})]$ $E_F = [V_R \text{ or } E_{EF}]$ It can be seen that even though the processing appears quite complex, the implementation is made real simple by placing all the complexity in the digital logic block. Again, switches K1 – K24 could be reed relays. These are activated by the digital logic. They are shown again as switches for convenience. The fixed division, 1 divided by $V_R$, can be performed through a precision voltage divider circuit.

The digital commands or switching signals which need to be generated in the digital logic circuit of FIG. 4 by actuation of the 11 push buttons in order to operate the several relays or switches can be summarized as follows:

| Relay No. | Function Needed to Operate Relay |
|---|---|
| K1 | $M_1$ |
| K2 | $\overline{M_1}$ |
| K3 | $M_1$ |
| K4 | $\overline{M_1}$ |
| K5 | $M_2$ |
| K6 | $\overline{M_2}$ |
| K7 | $M_2$ |
| K8 | $\overline{M_2}$ |
| K9 | $M_3$ |
| K10 | $\overline{M_3}$ |
| K11 | $M_3$ |
| K12 | $\overline{M_3}$ |
| K13 | $M_2 \cdot C_X \cdot \overline{D_X} \cdot (G_Y + G_Z)$ |
| K14 | $M_2 \cdot \overline{C_X} \cdot D_X \cdot (G_Y + G_Z 0$ |
| K15 | $\overline{K13 \cdot K14}$ |
| K16 | $M_3 \cdot E_Y \cdot \overline{F_Y} \cdot G_Z$ |
| K17 | $M_3 \cdot \overline{E_Y} \cdot F_Y \cdot G_Z$ |
| K18 | $\overline{K16 \cdot K17}$ |
| K19 | $(x \cdot G_Z) \cdot (M_3 \cdot E_X \cdot \overline{F_X})$ |
| K20 | $(x \cdot G_Z) \cdot (M_3 \cdot \overline{E_X} \cdot F_X)$ |
| K21 | $\overline{K19 \cdot K20 \cdot K22}$ |
| K22 | $\overline{x} + G_Z$ |
| K23 | $\overline{y} + \overline{G_Z}$ |
| K24 | $y \cdot G_Z$ |

where $x$ is defined as follows:

$x = \overline{\overline{E_X \cdot F_x} + (\overline{M_3} + C_x \cdot D_x) \cdot (C_x + D_x) \cdot (E_y + F_y) + M_2 \cdot \overline{M_3} \cdot (E_x \cdot F_y + EAXy \cdot F_x) \cdot (C_x \cdot \overline{D_x} + \overline{C_x} \cdot D_x)}$ and where y is defined as follows:

$y = \overline{\overline{M_2} \cdot M_3 \cdot (E_x \cdot F_y + E_y \cdot F_x) \cdot (C_x \cdot \overline{D_x} + \overline{C_x} \cdot D_x) + (C_x + D_x) \cdot (E_y + F_y)}$ If $C_X = 1$, $C$ switching amplifier is turned off.

If $D_X = 1$, $D$ switching amplifier is turned off.

If $E_X$ or $E_Y = 1$, $E$ switching amplifier is turned off.

If $F_X$ or $F_Y = 1$, $F$ switching amplifier is turned off.

This arrangement permits the selection of up to four video signals for display out of the six available. These include the ones previously described with respect to FIG. 3 plus others, such as, E, F, AE, AF, BE, BF, CE, CF, DE, DF, ABE, ABF, CDE, CDF, ABCD, ABCE, ABCF, ABDE and ABDF. It should be noted that in addition to $C_X$ and $D_X$ inactivating the C and D amplifiers respectively, $E_X$ or $E_Y$ inactivates the E amplifier, such as by opening the switch 13, and $F_X$ or $F_Y$ inactivates the F switching amplifier.

The examples given cover only certain conditions. In practice, other conditions exist. In fact, many times it is desirable to operate using both time sharing and amplitude sharing. To attain the required flexibility, the control voltages from various subtractors must be routed through various analog devices in accordance with the instructions from the control unit. This routing is accomplished by fast reed relays which, in turn, are operated by digital logic circuits. The digital logic senses the push button selected in the control unit and, depending upon the mode selected, energizes the proper relays setting the proper route for the control voltages.

Figure 5:
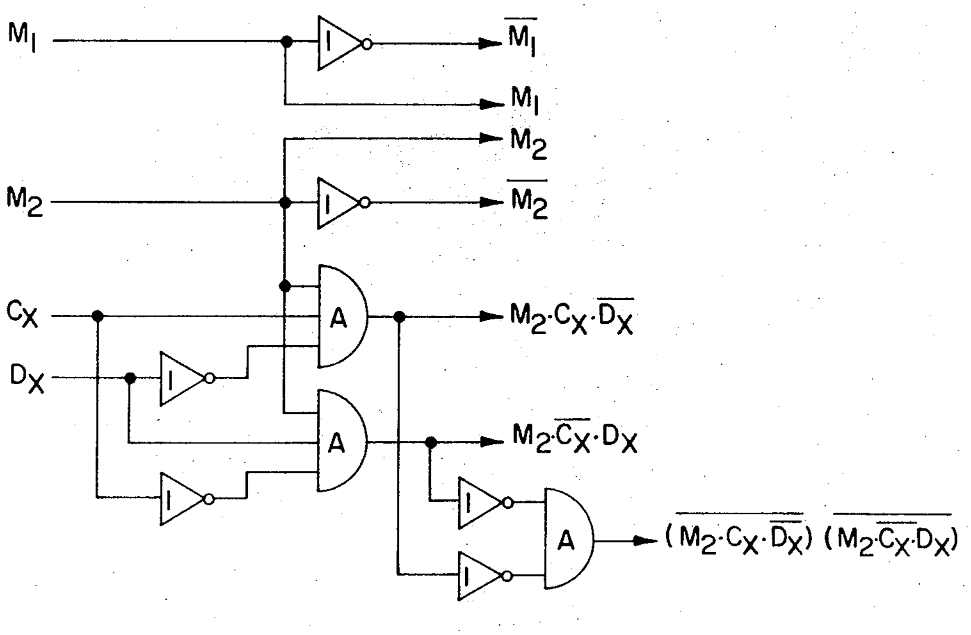
FIG. 5 is a logic diagram showing how various binary switching signals are developed for operating switches to select desired video signals to be amplitude shared.

Referring to FIG. 5, there is shown logic circuits to obtain the desired switching signals. The blocks labeled A constitute AND gates and those labeled I constitute inverters.

The above-mentioned logic control system greatly simplifies the video paths resulting in significant improvements in operational capability and signal quality. The functions such as mix, key, etc. are carried out by the use of a built-in digital and analog logic actuated by control panel controls.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed as new and desired to be secured by Letters Patent of the United States is:

1. An arrangement for controlling the relative amplitudes of first, second, third and fourth video signals $V_A$, $V_B$, $V_C$, $V_D$ comprising a source of first, second and third unidirectional control signals $V_R - E_{AB}$, $E_{AB}$, $V_R - E_{CD}$, $E_{CD}$ wherein $E_{AB}$ and $E_{CD}$ are independently adjustable between a lower and an upper amplitude limit $V_R$, means for modifying the amplitude of said $V_R - E_{AB}$ and said $E_{AB}$ control signal as a function of $E_{CD}$, $F(E_{CD})$, to provide a $(V_R - E_{AB}) \times F(E_{CD})$ and a $(E_{AB}) \times F(E_{CD})$ modified control signal, a first, second, third and forth amplifier each responsive to a respective video signal and a respective one of said $$E_{CD},\ V_R - E_{CD},$$

$$(E_{AB}) \times F(E_{CD}),$$

and $$(V_R - E_{AB}) \times F(E_{CD})$$

control signals for modifying the amplitude of its respective video signal in accordance with the amplitude of its respective control signal over the range of adjustments of said $E_{AB}$ and $E_{CD}$ signals.

2. An arrangement according to claim 1 wherein $F(E_{CD}) = V_R - E_{CD}/V_R$ and said one of said amplifiers associated with the $(V_R - E_{CD})$ control signal is rendered inoperative.

3. An arrangement according to claim 1 wherein $F(E_{CD}) = (E_{CD}/V_R)$ and said one of said amplifiers associated with the $(E_{CD}/V_R)$ control signal is rendered inoperative.

4. An arrangement according to claim 1 comprising means for causing selected signals among $E_{CD}$, $(V_R - E_{CD})$, $(E_{AB}) \times F(E_{CD})$ and $(V_R - E_{AB}) \times F(E_{CD})$ to be equal to $V_R$.

5. An arrangement according to claim 1 wherein said means for modifying said $(V_R - E_{AB})$ and said $E_{AB}$ control signals comprises, a respective multiplier for multiplying said $(V_R - E_{AB})$ and $E_{AB}$ signals by said $(V_R - E_{CD})$ or said $E_{CD}$ signals to provide first and second remainder signals, and a divider for dividing said remainder signals by the value of $V_R$ to provide said $(E_{AB}) \times F(E_{CD})$ and $(V_R - E_{AB}) \times F(E_{CD})$ signals.

6. An arrangement for combining any selected three of four available output signals on an amplitude-sharing basis using a respective parallel connected amplifier for each output signal comprising means for providing four unidirectional control signals $V_R - E_{AB}$, $E_{AB}$, $V_R - E_{CD}$, $E_{CD}$ wherein $E_{AB}$ and $E_{CD}$ are independently adjustable between a lower and an upper amplitude limit $V_R$, means for modifying the amplitudes of said $V_R - E_{AB}$ and said $E_{AB}$ control signal as a function of $E_{CD}$ to provide respective modified control signals, each of the amplifiers corresponding to the selected output signals being responsive to a respective one of said $E_{CD}$, $V_R - E_{CD}$, modified $E_{AB}$ and modified $V_R - E_{AB}$ control signals for modifying the amplitude of its respective output signal while maintaining the total amplitude of the selected output signals constant over the range of adjustments of said $E_{AB}$ and $E_{CD}$ signals.

7. A signal processing arrangement for producing two output signals in response to one input signal under the control of a digital command source comprising means responsive to said digital command source being operated to one logic state for producing a first output signal equal to the difference between a reference signal and said input signal, and responsive to said digital command source being operated to its other logic state for producing a first output voltage equal to said reference signal, means responsive to said digital command source being operated to one to produce a second output voltage equal to said input voltage and responsive to said digital command source being operated to its other state to produce a second output voltage equal to said reference voltage.

8. A signal processing arrangement comprising a reference amplitude signal source, a source of a first amplitude signal adjustable between zero and said reference amplitude, a source of a second amplitude signal adjustable between zero and said reference amplitude, mechanical means movable along a single path for adjusting the amplitudes of said first and second voltages, producing means responsive to applied signals for producing output signals, means to subtract said first signal from said reference signal to give a first remainder, means to subtract the second signal from said reference signal to give a second remainder, a source of four binary switching signals, means responsive to a first combination of said switching signals to simultaneously apply said first signal, said first remainder and said second remainder to said producing means to produce a first output signal, means responsive to a second combination of said switching signals to simultaneously apply said second signal, said second remainder and said second signal to said producing means to produce a second output signal.

9. An arrangement for combining any selected four of six available output signals on an amplitude-sharing basis using a respective parallel connected amplifier for each output signal comprising means for providing unidirectional control signals $V_R - E_{AB}$, $E_{AB}$, $V_R - E_{CD}$, $E_{CD}$, $V_R - E_{EF}$, $E_{EF}$ wherein $E_{AB}$, $E_{CD}$ and $E_{EF}$ are independently adjustable between a lower and an upper amplitude $V_R$, means for modifying the amplitudes of said $V_R - E_{AB}$ and said $E_{AB}$ control signals as a function of both $E_{CD}$ and $E_{EF}$ and for modifying the amplitude of said $V_R - E_{CD}$ and said $E_{CD}$ control signals as a function of $E_{EF}$ to provide respective modified control signals, each of the amplifiers corresponding to the selected output signals being responsive to a respective one of said $E_{EF}$, $V_R - E_{EF}$, modified $E_{AB}$, modified $E_{CD}$, modified $V_R - E_{AB}$ and modified $V_R - E_{CD}$ control signals for modifying the amplitude of its respective output signal while maintaining the total amplitude of the selected output signals constant over the range of adjustments of said $E_{AB}$, $E_{CD}$ and $E_{EF}$ signals.

* * * * *